United States Patent [19]
Mann

[11] Patent Number: 5,285,112
[45] Date of Patent: Feb. 8, 1994

[54] FLUID ENERGY COLLECTION SYSTEM

[75] Inventor: Michael J. Mann, Tucson, Ariz.

[73] Assignee: Star Energy Company, L.L.C., Tucson, Ariz.

[21] Appl. No.: 948,397

[22] Filed: Sep. 21, 1992

[51] Int. Cl.$^5$ ............................ F03D 7/00; F03D 3/00
[52] U.S. Cl. .......................... 290/44; 290/55; 416/117
[58] Field of Search ............... 290/44, 55; 415/4.2, 415/4.4; 416/9, 12, 117 R, 117 A, 117 B, 117

[56] References Cited

U.S. PATENT DOCUMENTS

| 0,583 | 1/1938 | Lewis et al. | 416/117 |
| 13,268 | 7/1855 | Morgan | 416/117 |
| 427,846 | 5/1890 | Garcia-Sanchez | 416/117 |
| 4,410,806 | 10/1983 | Brulle | 290/44 |

FOREIGN PATENT DOCUMENTS

| 1255737 | 9/1986 | U.S.S.R. | 416/117 |

OTHER PUBLICATIONS

U.S. Pat. No. 4,963,761, entitled "Wind-Driven Power Generator" issued to Wight on Oct. 16, 1990.
U.S. Pat. No. 4,764,683, entitled "Wind Powered Electric Generator" issued to Coombes on Aug. 16, 1988.
U.S. Pat. No. 4,449,053, entitled "Vertical Axis Wind Turbine" issued to Kutcher on May 15, 1984.
U.S. Pat. No. 4,582,013, entitled "Self-Adjusting Wind Power Machine", issued to Holland, Jr. on Apr. 15, 1986.
U.S. Pat. No. 5,057,696, entitled "Vertical Windmill With Omnidirectional Diffusion", issued to Thomas on Oct. 15, 1991.
U.S. Pat. No. 4,609,827, entitled "Syncro-Vane Vertical Axis Wind Powered Generator", issued to Nepple on Sep. 2, 1986.

Primary Examiner—Jeffrey A. Gaffin
Assistant Examiner—Robert Lloyd Hoover
Attorney, Agent, or Firm—Ogram & Teplitz

[57] ABSTRACT

An efficient fluid energy collection and conversion system which has energy collectors that travel both upstream and downstream in a fluid stream. Energy collectors are mounted on a rotatable hub; during each rotation, the energy collectors travel through a downstream portion and an upstream portion of the fluid. The energy collectors' shape is changed to increase their drag while traveling downstream in the fluid stream to collect energy, and their shape is changed to decrease their drag while traveling upstream in the fluid stream to conserve energy. The energy collectors' shape are changed either passively by the pressure of the fluid stream, or actively, by computer control using servos, hydraulics, gears, pulleys, or the like. The system is adjustable to varying wind conditions. Some, or all, of the collectors are deactivated when less energy collection is desired such as during very high wind conditions. Likewise, all the energy collectors are activated when the winds are light. The energy collected from the fluid stream is converted into electrical power or used for other purposes.

20 Claims, 4 Drawing Sheets

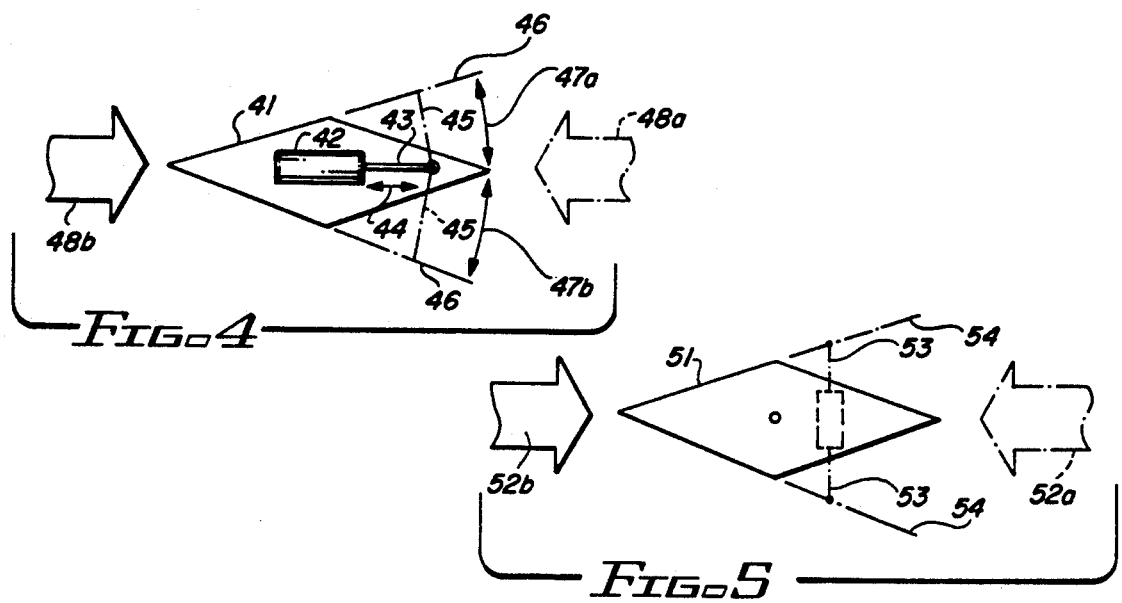
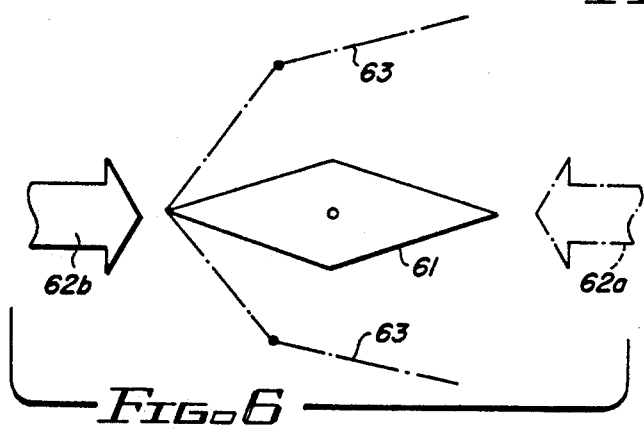
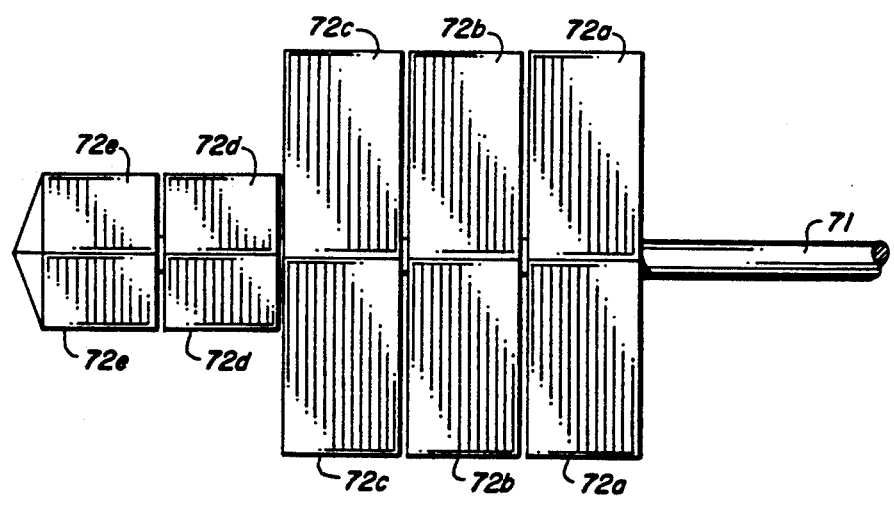

FLUID ENERGY COLLECTION SYSTEM

BACKGROUND OF INVENTION

This invention relates generally to energy generation and more specifically to wind and fluid energy collection and conversion to electrical power.

Man has harnessed wind and water power for hundreds or even thousands of years. Windmills and water mills have been used to grind wheat, pump water, power machines, generate electric power, and the like.

Today the need to harness wind and water power continues. It is used when other sources of power are too expensive, inconvenient, unavailable, environmentally undesirable, encouraged by government regulation, or for many other reasons.

Traditional windmills are comprised of a plurality of vanes which face into and collect energy from the prevailing winds. Vanes are mounted on a horizontal axis. The vanes capture wind energy causing the vane assembly to rotate on the horizontal axis thereby converting wind energy into rotating mechanical energy.

Traditional windmills did not rotate on a base to face directly into the wind at all times. They were built to face the only the prevailing winds. Because of this, their efficiency is decreased when the wind comes from other than directly at the windmill's vanes.

More recent windmills are designed to be rotatable on a base so the vanes face into the wind regardless of the direction the wind.

Despite many improvements and new designs in this field, there remain many problems which have not been adequately resolved.

Traditional windmills are large, inefficient, costly to build and maintain, and are a safety hazard to pedestrians due the rotation of their vanes. There is also the problem of controlling the speed of the windmill in high winds. High winds can destroy a windmill unless precautions are taken to slow the windmill, stop it completely, or protect it from the wind, etc.

Additionally, windmills do not rotate at the most efficient speed for the task they are performing. If the wind is strong they rotate too fast, if the wind is light they rotate too slow. Finally, most windmills are designed to be most efficient for an average wind speed. They are not designed to be adaptable to varying wind speed conditions.

Clearly, there exits a need for an improved wind or fluid energy collection device which is efficient, safer, adaptable for use in high wind or low wind conditions, and which is controllable to rotate at a desired speed.

SUMMARY OF INVENTION

The invention creates an efficient fluid energy collection and conversion system which has energy collectors that travel both upstream and downstream in a fluid stream. Energy collectors are mounted on a rotatable hub. During each rotation, the energy collectors travel through a downstream portion and an upstream portion. The energy collectors shapes are changed to increase their drag while traveling downstream in the fluid stream to collect energy; and their shapes are changed to decrease their drag while traveling upstream. The energy collectors' shapes are changed either passively by the pressure of the fluid stream or actively by computer control using servos, hydraulics, gears, pulleys, or the like.

The system is adjustable to varying wind conditions. Some or all of the collectors are deactivated when less energy collection is desired such as during very high wind conditions. Likewise, all the energy collectors are activated when the winds are light. The energy collected from the fluid stream is converted into electrical power or used for other purposes.

The heart of the invention are the energy collectors used to collect the wind or fluid energy. These energy collectors have at least two configurations (or shapes). One configuration is a high drag configuration which is used to collect energy when the energy collector is traveling with the wind or fluid stream. The second configuration is a low drag configuration which is used to conserve energy when the energy collector is traveling against the wind or fluid stream.

The energy collectors are mounted on arms that rotate in the wind or fluid stream. Each rotation of the arms consists of a downstream portion and an upstream portion. The energy collectors collect energy while traveling in the downstream portion. The energy collected translates into rotational energy for the arms. The energy collectors do not collect energy while traveling in the upstream portion of the rotation. They actually lose or give-up energy while traveling upstream. However, because of their low drag configuration changing capability, much less energy is given up traveling upstream than is collected while traveling downstream.

For each rotation, each energy collector collects much more energy than it gives up, thus resulting in a net gain of energy collected. When compared to the existing art, this margin of gain is significantly higher than that which is currently obtained.

The preferred embodiment uses several arms extending out from and rotating about a vertical axis. Several energy collectors are attached to each arm. As the energy collectors travel through the downstream portion of the rotation they are changed to their high drag configuration to collect as much energy as possible. As they travel through the upstream portion of the rotation they are changed to their low drag configuration to conserve as much energy as possible.

Several types of configurable energy collectors are discussed below. Those of ordinary skill in the art readily recognize various alternative structures which embody the current invention's characteristics.

One type of configurable energy collector changes configuration based on the fluid pressure acting on the energy collector itself. This type of energy collector operates similar to an umbrella held in the wind. If an umbrella is pointed downwind, wind tends to be "caught" by the umbrella and the umbrella opens. Conversely, if an open umbrella is pointed upwind, the wind tends to "push" on the umbrella and collapse it. Similar to the umbrella, this type of energy collector changes between a high drag configuration and a low drag configuration depending on its position in the fluid stream.

The second type of configurable energy collector is similar to the first type except they are controllably changed between their low drag and high drag configurations by mechanical means. Several of these type are described below, but they all use some kind of mechanical, servo, hydraulic, gear, pulleys, or the like, actuator to change the configuration of the energy collectors. The actuator means is controlled by computer.

One important advantage of this invention is the control it allows over the rotating speed of the arms. This invention permits individual energy collectors to be deactivated so they stop collecting energy. If the rotating speed is too fast some energy collectors are deactivated. The more energy collectors that are deactivated, the less energy is collected, and the slower the rotation. Conversely, if faster rotation is desired, more energy collectors are activated, causing more energy to be collected and consequently faster rotation.

Energy collectors are deactivated by keeping the energy collector in either its high drag or its low drag configuration throughout its rotation.

A computer controller constantly monitors the rotational speed of the energy collectors and activates or deactivates energy collectors as needed to control the speed of the rotation.

In very low wind conditions, all the energy collectors are activated. Conversely, in high wind or storm conditions, all the energy collectors are deactivated.

An alternate method of damping the amount of energy collected by the energy collectors is to reduce the portion of the rotation in which the energy collectors are in a high drag configuration. This method is described in detail below.

Several embodiments of the invention are illustrated in the figures and described more fully below.

BRIEF DESCRIPTION OF THE DRAWINGS

FIG. 4 shows the preferred embodiment of a controllable energy collector.

FIG. 5 shows yet another embodiment of a controllable energy collector.

FIG. 6 shows an embodiment of a wind pressure activated energy collector.

FIG. 7 shows the selective activation/deactivation feature of the invention.

DETAILED DESCRIPTION OF THE DRAWINGS

Figure 1:
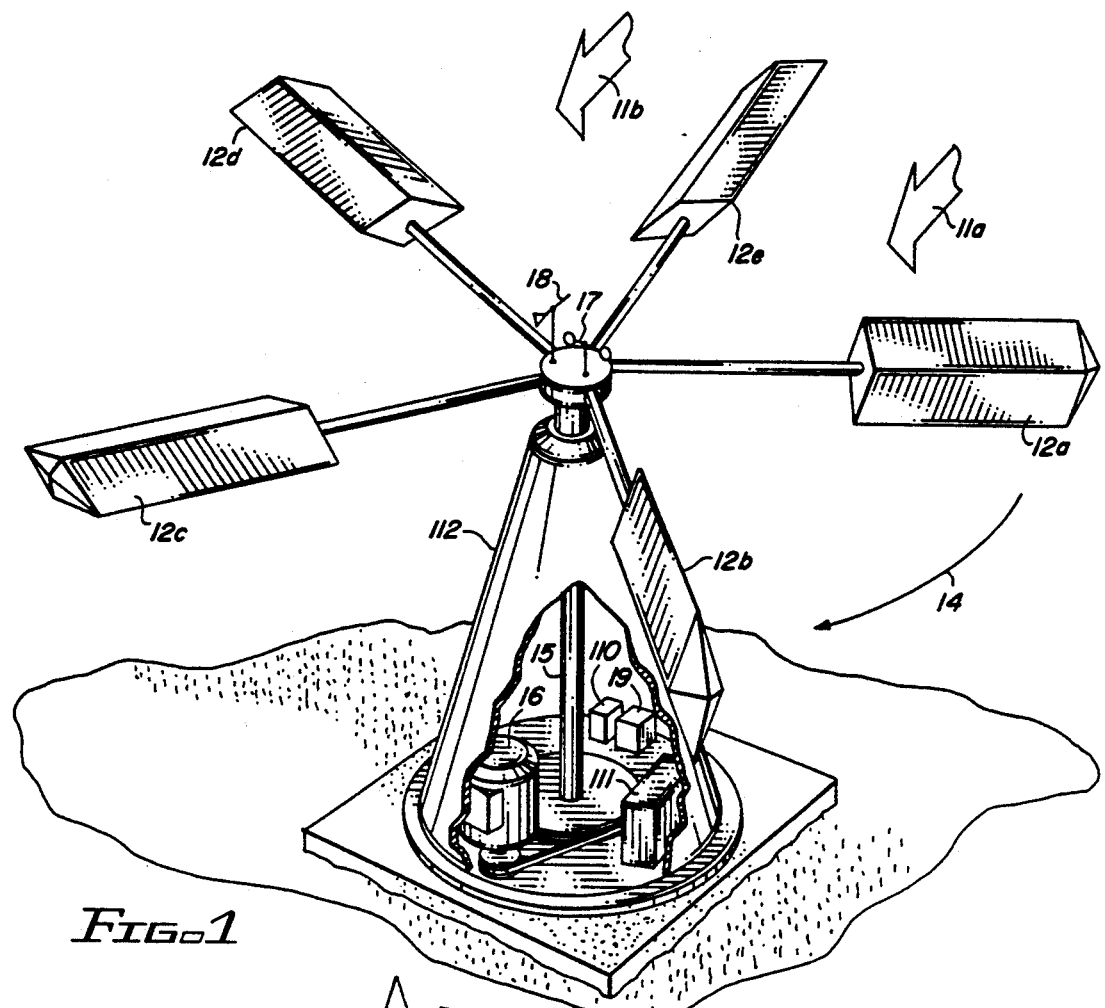
FIG. 1 shows the preferred embodiment of the invention.

FIG. 1 shows the preferred embodiment of the invention.

Downwind portion, wind 11a, blows against energy collectors 12a and 12b. Energy collectors 12a and 12b are in their high drag configuration and collect the wind energy. Energy collected by energy collectors 12a and 12b are converted into rotational energy of the arm assembly 13 causing arm assembly 13 to rotate as shown by arrow 14 about a vertical axis.

Upwind portion, wind 11b, blows against energy collectors 12c and 12d as they travel upwind. Energy collectors 12c and 12d are in their low drag configuration and consequently use very little energy to travel upwind against wind 11b.

Energy collector 12e is at the boundary between the upwind and downwind portions of the rotation. It is changing from a low drag configuration to a high drag configuration.

The rotation of arm assembly 13 causes axle assembly 15 to rotate. Generator 16 converts the rotational energy of axle assembly 15 into electric energy.

Wind speed sensor 17, wind direction sensor 18, rotation speed sensor 19, and position sensor 110 communicate data to computer 111.

Computer 111 computes the boundaries of the upwind and downwind portions of the rotation based on data from wind direction sensor 18. Computer 111 commands energy collectors 12a, 12b, 12c, 12d, and 12e, to change their configurations as they transition between the upwind and downwind portions of the rotation. The computer's calculations are based on data from wind direction sensor 18 and position sensor 110.

In an alternate embodiment, computer 111 delays changing energy collectors 12a thru 12e from low drag to high drag configuration as they transition between the upwind and downwind portions of the rotation. This delay causes less energy to be collected by energy collectors 12a thru 12e. This delay is increased or decreased to control the amount of energy collected by the energy collectors 12a thru 12e.

In the preferred embodiment, computer 111 uses data from wind speed sensor 17 and rotation speed sensor 19 to calculate when to activate or deactivate more energy collectors.

Selective "catching" of the wind, based upon rotational speed, in this embodiment, is accomplished by delaying or extending the high drag/low drag configuration so as to reduce or expand the wind catching capability.

Housing 112 encloses generator 16, axle 15, computer 111, rotation speed sensor 19, and position sensor 110 from the elements.

Figure 2:
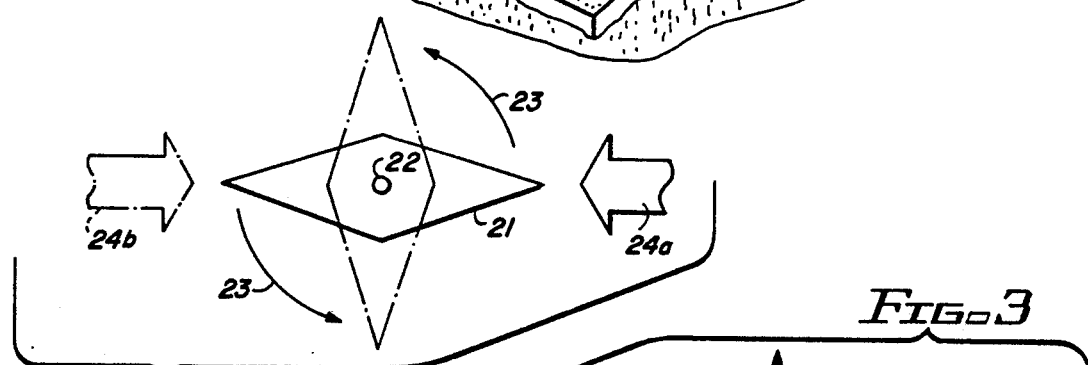
FIG. 2 shows one embodiment of a controllable energy collector.

FIG. 2 show a side view of one embodiment of a controllable energy collector.

Energy collector 21 changes between its low drag configuration and its high drag configuration by rotating about axis 22 as shown by arrows 23. In its low drag configuration, shown by solid lines, energy collector 21 travels upwind with little loss of energy. In its high drag configuration, shown by dashed lines, energy collector 21 travels downwind collecting energy.

Energy collector 21 is rotated about axis 22 by motor (not shown). The motor communicates with and is controlled by computer 111.

Upwind airflow is shown by arrow 24a and downwind airflow is shown by arrow 24b.

Figure 3:
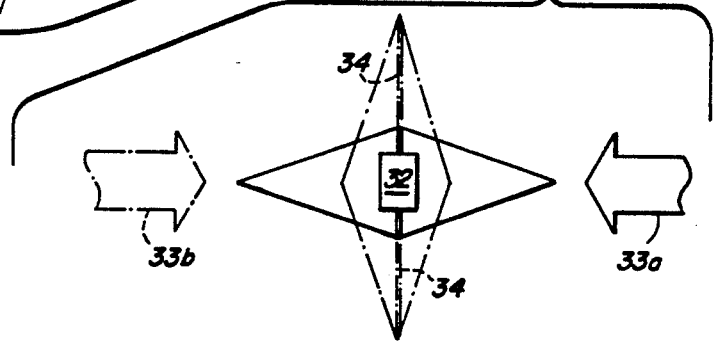
FIG. 3 shows an alternate embodiment of a controllable energy collector.

FIG. 3 shows a side view of another embodiment of a controllable energy collector.

Energy collector 31 is changeable between a low drag configuration and a high drag configuration by servo 32. Energy collector's low drag configuration is shown by the solid lines. The energy collectors' high drag configuration is shown by dashed lines.

Downwind airflow and upwind airflow are illustrated by arrows 33 and 33a respectively.

When servo 32 extends servo arms 34, the height of energy collector 31 is increased and the width is decreased. This configuration causes energy collector 31 to have greater surface area exposed to the downwind airflow 33b thus collecting more energy.

When servo 32 retracts servo arms 34, the height of energy collector 31 is decreased and the width is increased. This configuration causes energy collector 31 to have less surface area exposed to the upwind airflow 33a thus allowing energy collector 31 to travel upwind with little loss of energy.

FIG. 4 shows a side view of the preferred embodiment of a controllable energy collector.

Energy collector 41 is mechanically changed between a low drag configuration and a high drag configuration by servo 42. Those skilled in the are can readily see that other means of actuation can be used such as hydraulic actuators and the like.

Servo 42 causes servo arm 43 to move in and out as shown by arrow 44. Movement of servo arm 43 causes support arms 45 to open and close energy collector flaps 46 as shown by arrows 47a and 47b.

Servo 42 is in communication with and controlled by computer 111 (not shown).

While traveling through the downwind portion of the rotation, energy collector flaps 46 are opened. This causes energy collector 41 to have high drag and allows energy collector 41 to collect energy.

It is important to note that energy collector 41 is used in two ways. Energy collector 41 is functional whether the wind blows from the direction shown by arrow 48a or arrow 48b.

While traveling through the upwind portion of the rotation, energy collector flaps 46 are closed. Energy collector flaps 46 are pulled into the body of energy collector 41 as shown by arrows 47a and 47b. This causes energy collector 41 to have low drag and permits energy collector 41 to travel through the upwind portion of the rotation with little loss of energy.

FIG. 5 shows a side view of yet another embodiment of a controllable energy collector.

This embodiment is very similar to that shown in FIG. 4 except for the actuation mechanism. In this embodiment, servo arms 53 act directly on energy collector flaps 54 without the need for a support arm.

When servo arms 53 are extended, energy collector flaps 54 are pushed opened and the drag of the energy collector is increased. Energy collector 51 is in this high drag configuration when it travels through the downwind portion of the rotation allowing it to collect wind energy.

When servo arms 53 are retracted, energy collector flaps 54 are pulled closed and the drag of energy collector 51 is greatly reduced. Energy collector 51 is in this low drag configuration when it travels through the upwind portion of the rotation. The low drag allows the energy collector to move through the upwind portion of the rotation with only a small loss of energy.

Arrows 52a and 52b indicate the downwind and upwind airflows respectively.

FIG. 6 shows a side view of a passive or wind pressure actuated energy collector.

Energy collector 61 operates similar to the umbrella example discussed earlier. When energy collector 61 travels through the downwind portion of the rotation, wind 62a catches movable flaps 63. The wind pressure opens flaps 63 much the same way as wind would open an umbrella. When flaps 63 are open (shown by dashed lines) they are in a high drag configuration and are able to collect more wind energy.

When energy collector 61 travels through the upwind portion of the rotation, wind 62b pushes on flaps 63. The wind pressure closes flaps 63. When flaps 63 are closed (shown by solid lines), energy collector 61 in a low drag configuration and is able to travel through the upwind portion of the rotation with little loss of energy.

FIG. 7 shows the selective deactivation feature of the invention.

FIG. 7 is a front view of an arm 71 with five controllable energy collectors 72a thru 72e attached to it. A useful feature of the invention is its ability to adapt to varying wind conditions. When the wind is light, all energy collectors 72 are activated to collect as much energy as possible. In high winds, some or all of the energy collectors 72 are deactivated to prevent the device from being rotated too fast and damaged.

In FIG. 7, arm 71 and energy collectors 72 are shown configured for traveling through the downwind portion of the rotation. This is evident from the three energy collectors 72a 72b, and 72c being in the open or high drag configuration. Energy collectors 72d and 72e are in the closed or low drag configuration.

Servos, hydraulic actuators, or the like (as described in earlier figures) move the energy collectors between their high and low drag configurations. Servos (not shown) are controlled by a computer (not shown).

FIG. 7 shows the configuration used in a moderately high wind. The wind is so strong that all the energy collectors 72 are not needed to rotate arm 71 at the desired speed. The computer (not shown) has calculated that three of the five energy collectors 72 are enough to collect sufficient energy to rotate arm 71 at the desired rate.

Figure 8A:
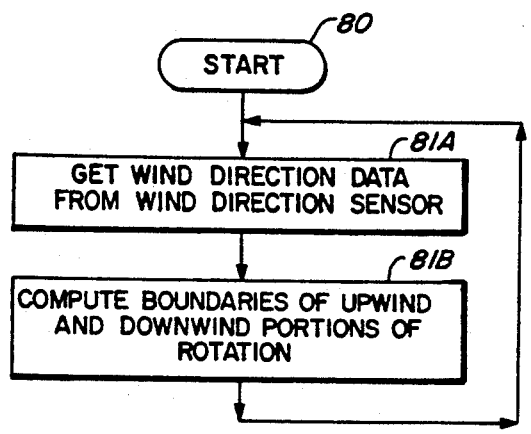
FIG. 8a is a flowchart for the upwind/downwind boundary computations done by the computer.

FIG. 8a is a flowchart for the upwind/downwind boundary computations done by the computer.

One of the tasks of the computer is to calculate the boundary between the downwind portion and the upwind portion of each rotation. The computer must know where these transition points are so that the computer properly commands the energy collectors to change configuration at the correct location.

Once the program is initialized, 80, wind direction data is collected 81a from the wind direction sensor and the boundaries are computed 81b for the upwind and downwind portions.

This computation must be done whenever there is a change in the wind direction or to enhance or decrease wind catching capabilities.

The computer receives data from wind direction sensor and computes the boundary between the downstream and upstream portions of the rotation.

This process is continued during operation of the system.

Figure 8B:
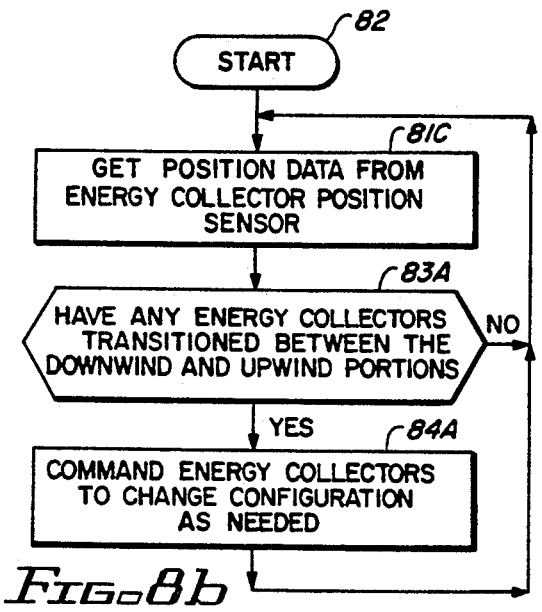
FIG. 8b is a flowchart for controlling the energy collectors' configuration.

FIG. 8b is a flowchart for controlling the energy collectors configuration.

After start, 82, the computer receives data 81c from position sensor and calculates if any energy collectors have transitioned between the upstream and downstream portions of the rotation 83a. If a transition has occurred (or is about to occur), the identified energy collectors are commanded to change to the appropriate configuration 84a, i.e. high drag configuration if transitioning to the downwind portion of the rotation, and low drag configuration if transitioning to the upwind portion of the rotation.

If no transition has occurred, then the system returns to monitor for a transition, 8c.

This control continues throughout operation.

Figure 8C:
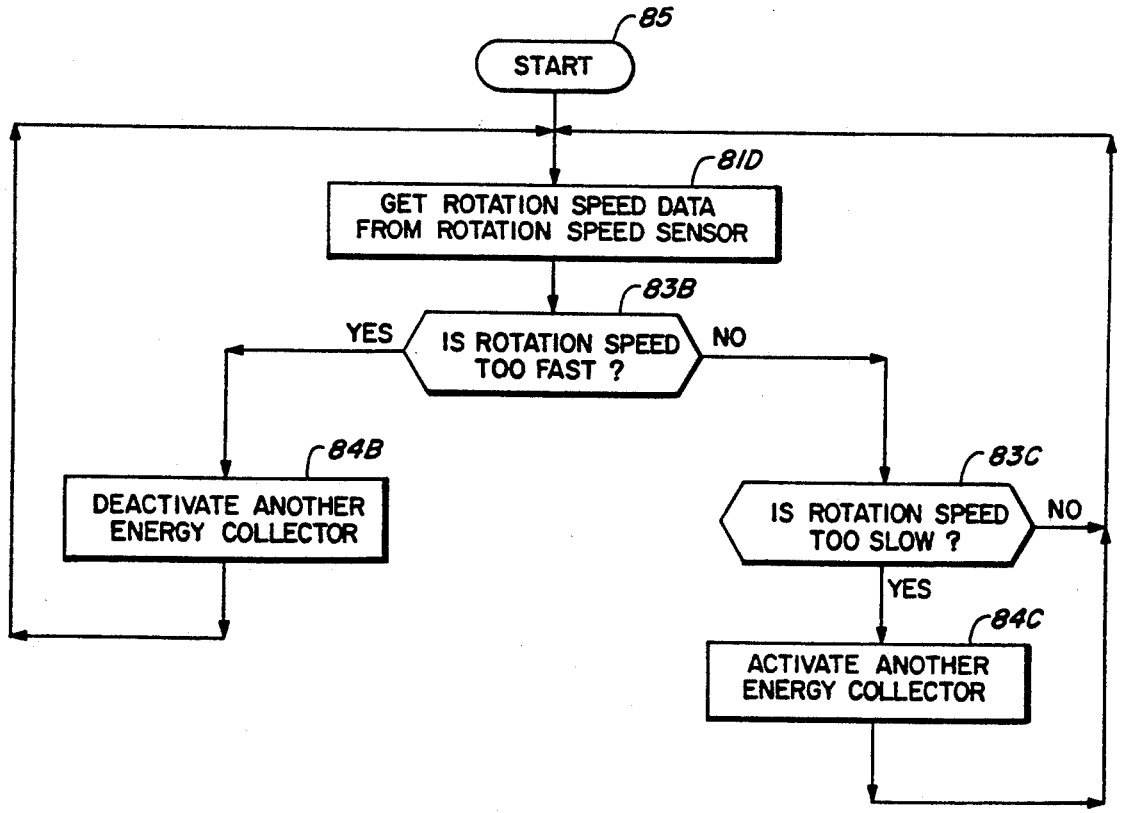
FIG. 8c is a flowchart for controlling the rotating speed of the energy collectors.

FIG. 8c is a flowchart for controlling the rotation speed of the energy collectors.

After start, 85, the computer receives data from the rotation speed sensor 81d. A determination, 83b, is made based on rotational speed. If the rotation speed is too fast, additional energy collectors are deactivated 84b. If the rotation speed is too slow 83c, additional energy collectors are activated 84c.

Figure 9A:
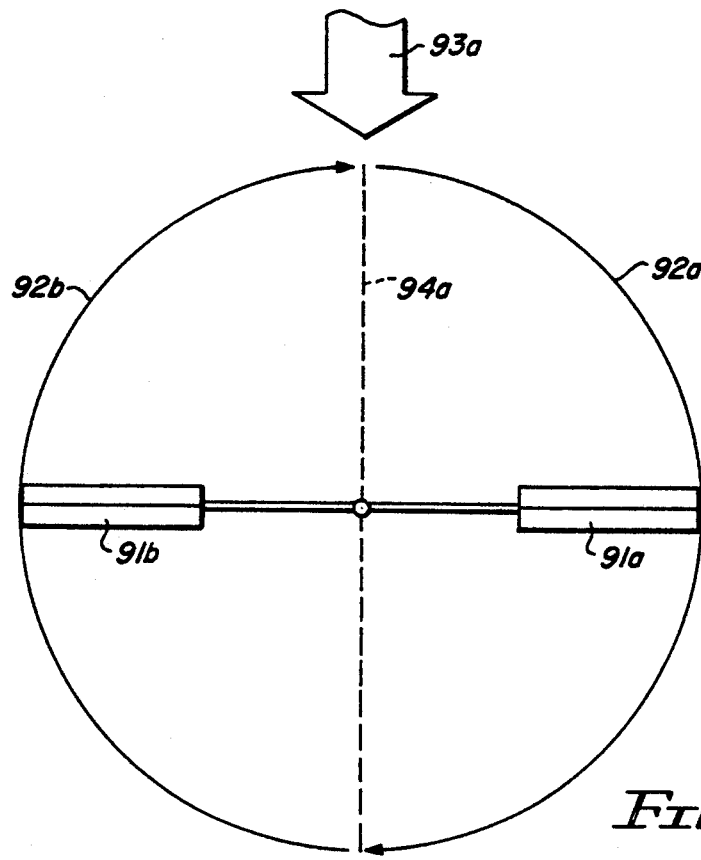
FIG. 9a is a top view showing the downwind and upwind portions of the energy collectors rotation.

FIG. 9a is a top view showing the downwind and upwind portions of the energy collectors rotation.

Energy collectors 91a and 91b rotate as shown by arrows 92a and 92b. Wind blows in the direction shown by arrow 93a. Dashed line 94a shows the boundary between the downwind and upwind portions of the rotation. Arrow 92a shows the downwind portion of the rotation. Arrow 92b shows the upwind portion of the rotation.

As energy collector 91a travels through the downwind portion of the rotation it is in a high drag configuration and it collects energy from the wind. Energy collector 91a collects maximum energy when in high drag configuration through the entire downwind portion of the rotation. As energy collector 91b travels through the upwind portion of the rotation it is in a low drag configuration and uses little energy.

Figure 9B:
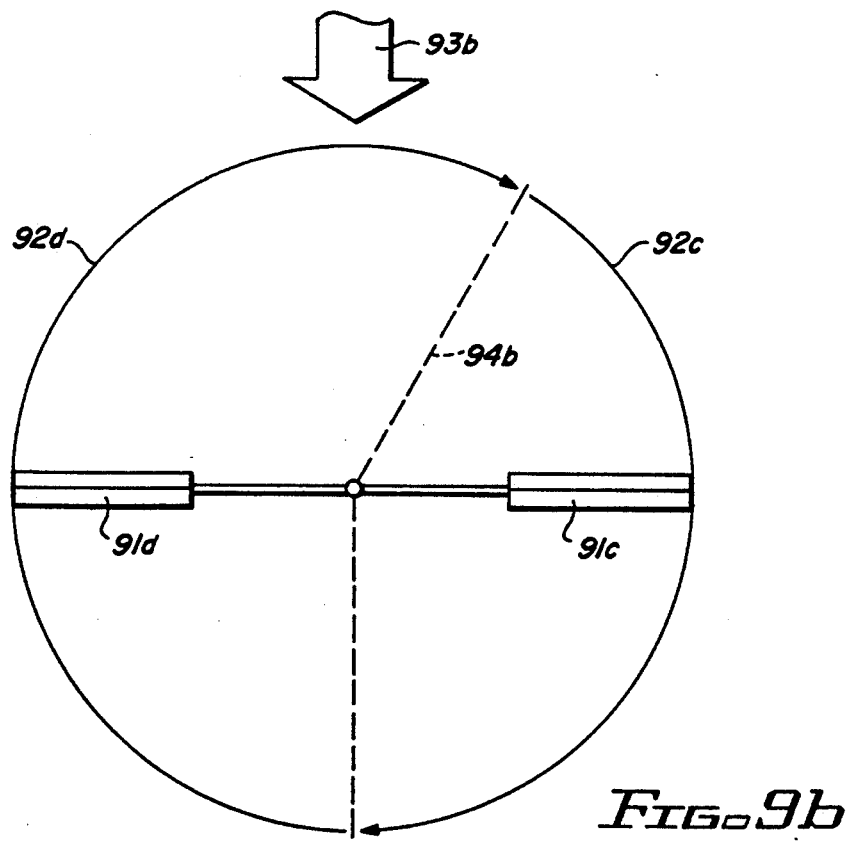
FIG. 9b is a top view showing an alternate method of damping the energy collected by the energy collectors.

FIG. 9b is a top view showing an alternate method of damping the energy collection of the energy collectors.

Energy collectors 91c and 91d rotate as shown by arrows 92c and 92d. Wind blows in the direction shown by arrow 93b. Dashed line 94b shows the boundary where energy collectors change between high drag and low drag configuration. Arrow 92c shows the portion of the rotation where energy collectors are in their high drag configuration. Arrow 92d shows the portion of the rotation where energy collectors are in their low drag configuration.

As shown, energy collector 91c is in high drag configuration for only part of the downwind portion of the rotation. Energy collector 91c consequently collects less then the maximum energy possible. Putting energy collector 91c in high drag configuration for only a portion of the downwind rotation reduces the energy collected and consequently slows the rotation of the energy collectors.

As wind speeds increase, energy collector 91c is put in high drag configuration for smaller portions of the downwind portion of rotation. The computer controls energy collectors 91c and 91d so that sufficient energy is collected to rotate the energy collectors at the desired speed.

It is clear from the foregoing that the present invention represents a new and useful apparatus for the collection and conversion of wind and fluid energy into electric power, mechanical energy and the like.

What is claimed is:

1. A fluid energy collection apparatus comprising:
   a) a hub rotatable about an axis;
   b) a plurality of arms attached to said hub and extending outward from said hub;
   c) at least one energy collection means attached to each of said arms, said energy collection means having a low drag configuration and a high drag configuration and wherein a cross section profile of said energy collection means changes between said low drag configuration and said high drag configuration, said arms and said energy collection means rotating in a fluid stream, each rotation having a downstream portion and an upstream portion; and,
   d) drag change means for selectively changing said energy collection means to said high drag configuration during rotation through said downstream portion of said rotation and to said low drag configuration during rotation through said upstream portion of said rotation.

2. The fluid energy collection apparatus according to claim 1 wherein the drag configuration of said energy collection means is selectively controlled such that:
   a) said energy collection means is in said high drag configuration while traveling through a portion of the downstream portion of said rotation; and
   b) said energy collection means is in said low drag configuration while traveling through the upstream portion of said rotation.

3. The fluid energy collection apparatus according to claim 2 wherein said high drag configuration includes means for expanding said energy collection means and wherein said low drag configuration includes means for contracting said energy collection means.

4. The fluid energy collection apparatus according to claim 3 wherein said means for expanding and said means for contracting are responsive to fluid energy motions.

5. The fluid energy collection apparatus according to claim 1 further comprising computer control means for controlling said drag change means.

6. The fluid energy collection apparatus according to claim 5 further including sensing means for sensing the direction of flow of said fluid energy and wherein said sensing means communicates data to said control means and wherein said control means includes means for establishing the limits of said downstream portion and said upstream portion of said rotation.

7. The fluid energy collection apparatus according to claim 6 wherein a plurality of said energy collection means are attached to each of said arms.

8. The fluid energy collection apparatus according to claim 7 further comprising:
   a) speed sensing means for sensing the rotational speed of said hub; and
   b) adjustment means for selective activation of said energy collection means based upon the speed of said hub.

9. The fluid energy collection apparatus according to claim 8 further comprising generator means connected to said hub for converting rotating mechanical energy of said hub into electrical energy.

10. A fluid energy collection device comprising:
    a) at least one arm rotatably mounted about an axis;
    b) each arm having at least one energy collection means, each energy collection means having a low drag configuration and a high drag configuration and rotating in a fluid stream, a cross section profile of said energy collection means changing between said low drag configuration and said high drag configuration, each rotation of said arm about said axis having a downstream portion and an upstream portion, said high drag configuration being selectively applied in the downstream portion.

11. The fluid energy collection device according to claim 10 wherein the drag configuration of said energy collection means is responsive to said fluid energy such that:
    a) said energy collection means is in said high drag configuration while traveling through the downstream portion of said rotation; and,
    b) said energy collection means is in said low drag configuration while traveling through the upstream portion of said rotation.

12. The fluid energy collection device according to claim 10 further comprising drag change means for changing said energy collection means to said high drag configuration during rotation through said downstream portion of said rotation and to said low drag configuration during rotation through said upstream portion of said rotation.

13. The fluid energy collection device according to claim 12 further comprising computer control means for controlling said drag change means.

14. The fluid energy collection device according to claim 13 further including sensing means for sensing the direction of flow of said fluid energy, and wherein said sensing means communicates data to said control means and wherein said control means includes means for establishing the limits of said downstream portion and said upstream portion of said rotation.

15. The fluid energy collection device according to claim 14 wherein a plurality of said energy collection means are attached to each of said arms.

16. The fluid energy collection device according to claim 15 further comprising:
   a) speed sensing means for sensing the rotational speed of said hub; and
   b) adjustment means for selectively activating said energy collection means based upon the speed of said hub.

17. The fluid energy collection device according to claim 16 further comprising generator means connected to said hub for converting rotating mechanical energy of said hub into electrical energy.

18. An energy generation system comprising:
   a) a hub rotatable about an axis;
   b) a plurality of arms attached to said hub and extending outward from said hub;
   c) a plurality of energy collection means attached to said arms, said energy collection means having a low drag configuration and a high drag configuration, said arms and said collection means rotating in a fluid stream, each rotation having a downstream portion and an upstream portion;
   d) drag change means for selectively changing said energy collection means to said high drag configuration during rotation through said downstream portion of said rotation and to said low drag configuration during rotation through said upstream portion of said rotation;
   e) sensing means for sensing the direction of flow of said fluid stream;
   f) speed sensing means for sensing the rotational speed of said hub;
   g) control means for
     1) establishing the limits of said downstream portion and said upstream portion of said rotation based upon data from said sensing means, and
     2) selectively controlling said drag change means based upon data from said speed sensing means; and
   h) generator means connected to said hub for converting rotating mechanical energy of said hub into electrical energy.

19. The energy generation system according to claim 18 wherein the drag configuration of said energy collection means is responsive to said fluid stream such that:
   a) said energy collection means has an increased drag configuration while traveling through the downstream portion of said rotation; and,
   b) said energy collection means has a decreased drag configuration while traveling through the upstream portion of said rotation.

20. The fluid energy collection apparatus according to claim 19 wherein a plurality of said energy collection means are attached to each of said arm.

* * * * *